US006516505B1

(12) United States Patent
Taylor

(10) Patent No.: US 6,516,505 B1
(45) Date of Patent: Feb. 11, 2003

(54) TOOL FOR INSTALLING REMOVABLE FASTENERS

(76) Inventor: James D. Taylor, Rte. 2, Box 245, Hinton, OK (US) 73407

( * ) Notice: Subject to any disclaimer, the term of this patent is extended or adjusted under 35 U.S.C. 154(b) by 0 days.

(21) Appl. No.: 09/929,390

(22) Filed: Aug. 14, 2001

(51) Int. Cl.[7] .......... B23P 19/04
(52) U.S. Cl. .......... 29/268; 29/270
(58) Field of Search .......... 29/268, 232, 242, 29/243, 238, 257, 248, 278

(56) References Cited

U.S. PATENT DOCUMENTS

| | | | | | |
|---|---|---|---|---|---|
| 854,732 | A | * | 5/1907 | Goucher | 29/268 |
| 938,819 | A | * | 11/1909 | Bowers | 29/268 |
| 1,319,829 | A | * | 10/1919 | Aylor et al. | 29/268 |
| 1,397,614 | A | * | 11/1921 | Bary | 29/268 |
| 3,990,137 | A | * | 11/1976 | Kulba et al. | 29/268 |
| 4,220,033 | A | | 9/1980 | Powderley | |
| 4,416,045 | A | * | 11/1983 | Staten | 29/268 |
| 4,462,240 | A | | 7/1984 | Yamamoto | |
| 4,507,839 | A | * | 4/1985 | Simpson | 29/268 |
| 4,541,266 | A | | 9/1985 | Totsu | |
| 4,958,510 | A | | 9/1990 | Denham et al. | |
| 6,108,885 | A | * | 8/2000 | Cox | 29/268 |

* cited by examiner

*Primary Examiner*—Lee Wilson
(74) *Attorney, Agent, or Firm*—Dunlap Codding & Rogers

(57) ABSTRACT

A hand powered tool for installing a removable fastener of the type having an elongated shaft, a fixed support and a plunger. The plunger is biased relative to the fixed support for installation and removal of the removable fastener in a pre-drilled hole of a workpiece by applying force to the plunger relative to the fixed support. The elongated shaft is operably connected to the plunger whereby movement of the plunger relative to the fixed support varies the diameter of the elongated shaft such that the diameter of the removable fastener can be decreased to permit insertion of the elongated shaft into the hole of the workpiece, and increased to prevent removal of the elongated shaft from the hole formed in the workpiece. The tool is provided with a barrel assembly, a fastener assembly and a handle assembly. The barrel assembly has an elongated barrel, and an anvil supported by the elongated barrel such that the anvil is movable in a first direction and a second direction. The fastener assembly stabilizes the fixed support of the removable fastener such that the plunger of the removable fastener is positioned adjacent to the anvil. The handle assembly is powered by a hand of an individual for selectively moving the anvil in the first direction and the second direction.

16 Claims, 3 Drawing Sheets

TOOL FOR INSTALLING REMOVABLE FASTENERS

CROSS-REFERENCE TO RELATED APPLICATIONS

Not Applicable.

STATEMENT REGARDING FEDERALLY SPONSORED RESEARCH AND DEVELOPMENT

Not Applicable.

BACKGROUND OF THE INVENTION

Removable fasteners are used in various industries for temporarily holding two or more panels together during assembly of projects. One example of such a removable fastener is referred to in the art as a "cleco" fastener.

In general, the "deco" type removable fastener has an elongated shaft, a fixed support and a plunger. The plunger is biased relative to the fixed support for installation and removal of the removable fastener in a pre-drilled hole of a work piece by applying force to the plunger relative to the fixed support. The elongated shaft is operably connected to the plunger whereby movement of the plunger relative to the fixed support varies the diameter of the elongated shaft such that the diameter of the elongated shaft can be decreased to permit insertion of the elongated shaft into the hole of the work piece, and increased to permit removal of the elongated shaft from the hole formed in the work piece.

In the past, the "cleco" type removable fasteners have been installed with special hand operated pliers or pneumatically powered tools. The hand operated pliers are operated by using manual force so as to install or remove the removable fastener. The pneumatically powered tools are operated by air or by the pressure or exhaustion of air. While the hand operated pliers and the pneumatically powered tools both satisfactorily install the removable fasteners, there are instances when the removable fasteners must be installed in tight or inaccessible areas, such as channels, corners, or other narrow work areas. In these instances, difficulty arises with the operation of the pliers because of the inability of the pliers to access the narrow work areas. The pneumatically operated installer can be used in narrow areas, but is costly and inconvenient to operate due to the presence of air compressors, hoses and the like.

Therefore, a need exists for an improved tool for installing removable fasteners in tight or inaccessible areas. It is to such an improved tool for the installation of removable fasteners which the present invention is directed.

DETAILED DESCRIPTION OF THE INVENTION

Figure 1:
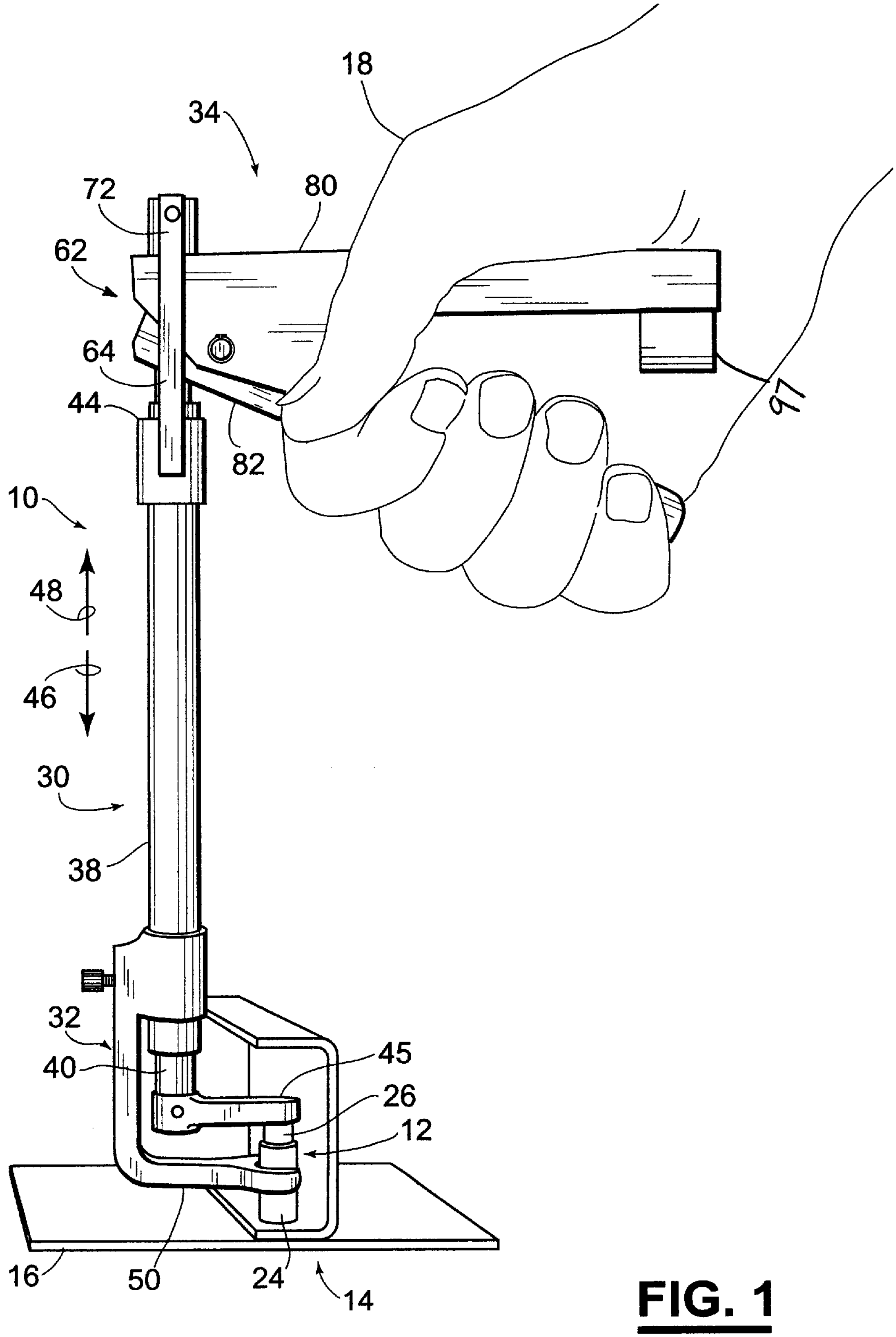
FIG. 1 is a perspective view of a tool, constructed in accordance with the present invention, for installing removable fasteners.

Referring now to the drawings, and more particularly to FIG. 1, shown therein and designated by a reference numeral 10 is a tool for installation and removal of a removable fastener 12 in a pre-drilled hole 14 of a work piece 16. The tool 10 is powered by a hand 18 of a user when installing or removing the removable fastener 12.

Figure 2:
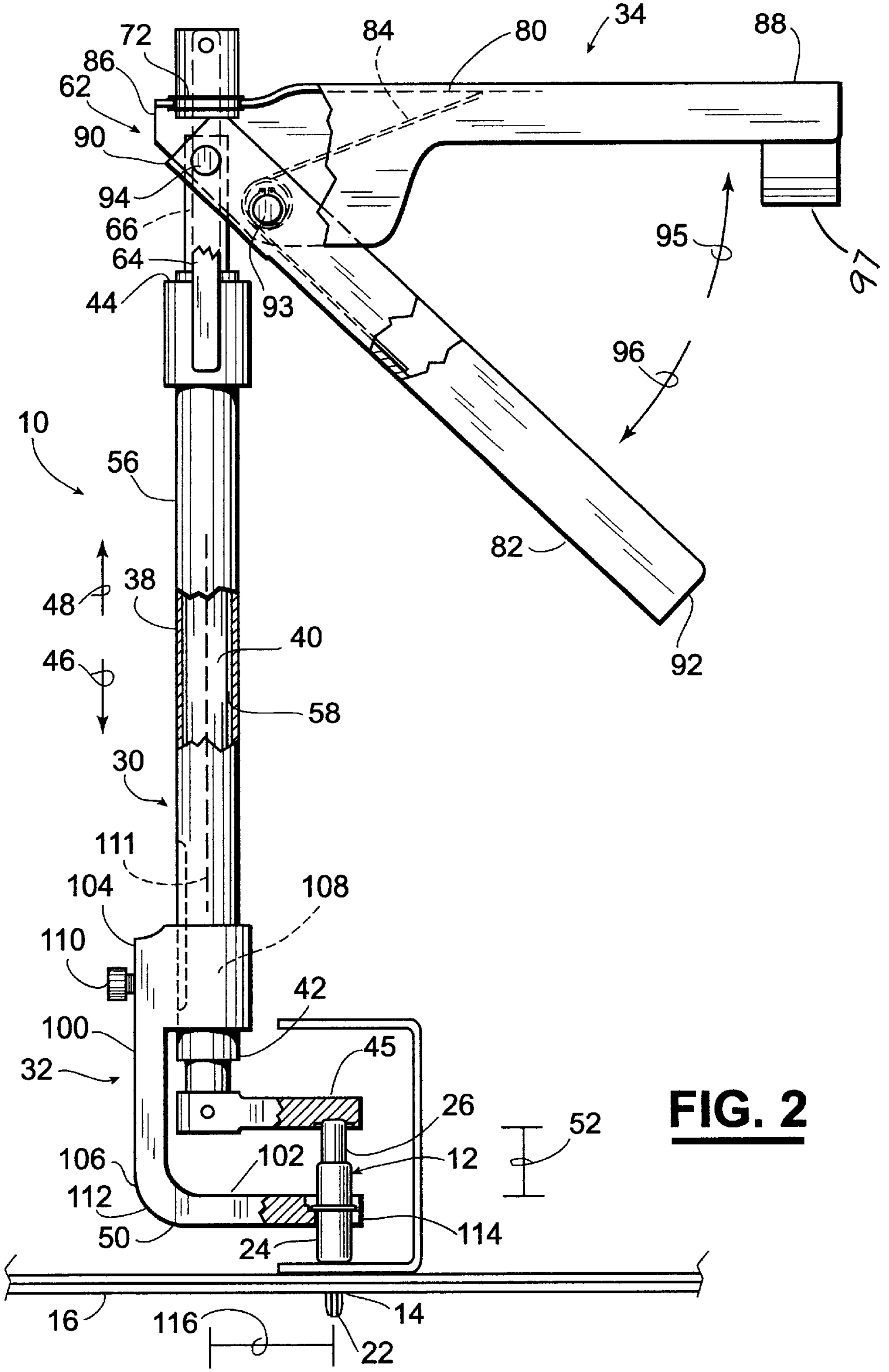
FIG. 2 is a partial, cross-sectional side view of the tool depicted in FIG. 1.

As best shown in FIG. 2, in one preferred embodiment, the removable fastener 12 is of the type having an elongated shaft 22, a fixed support 24, and a plunger 26. The plunger 26 is biased relative to the fixed support 24 for installation and removal of the removable fastener 12 in the pre-drilled hole 14 of the work piece 16 by applying force to the plunger 26 relative to the fixed support 24. The elongated shaft 22 is operably connected to the plunger 26 whereby movement of the plunger 26 relative to the fixed support 24 varies the diameter of the elongated shaft 22 such that the diameter of the elongated shaft 22 can be decreased to permit insertion of the elongated shaft 22 into the pre-drilled hole 14 of the work piece 16, and increased to prevent removal of the elongated shaft 22 from the pre-drilled hole 14 formed in the work piece 16.

The removable fastener 12 can be provided with a variety of sizes and/or configurations. For example, the fixed support 24 can be elongated or shortened depending on the particular application. The diameter of the elongated shaft 22 can be varied for insertion of the elongated shaft 22 into a variety of different sized pre-drilled holes 14. For example, the elongated shaft 22 can be sized for a 1/16, 3/8, 1/4, or 5/16 inch hole. A suitable removable fastener is known in the art as a "deco" type fastener and can be purchased from KP Supply, located in Oklahoma City, Okla. For example, common sizes are 3/16, 3/32, and 3/16×2 1/4, with common grip sizes of 0"–1/4", model number TP75-3/16, grip size 1/4"–1/2", model number TP75L-3/16, and grip size 1/2"–3/4", model number TP75SEL-3/16.

The tool 10 is provided with a barrel assembly 30, a fastener assembly 32, and a handle assembly 34. The barrel assembly 30 has an elongated barrel 38, and a plunger member 40. The elongated barrel 38 has a first end 42 and a second end 44. The plunger member 40 is supported by the elongated barrel 38. The barrel assembly 30 is also provided with an anvil 45 for engaging the plunger 26 of the removable fastener 12. The anvil 45 is connected to or formed integrally with the plunger member 40. As will be discussed in more detail below, at least a portion of the plunger member 40 is movable in a first direction 46, and a second direction 48.

The fastener assembly 32 has a holding member 50. The holding member 50 is spaced a distance from the anvil 45 for creating a gap 52 to receive the fixed support 24 and the plunger 26 of the removable fastener 12. Upon insertion of the fixed support 24 and the plunger 26 into the gap 52, the holding member 50 stabilizes the fixed support 24 such that the anvil 45 of the barrel assembly 30 is capable of engaging the plunger 26.

The handle assembly 34 is adapted to be powered by the hand 18 of an individual. In general, the handle assembly 34 is operably connected to the plunger member 40 for selectively moving the plunger member 40 relative to the holding member 50 of the fastener assembly 32 in the first direction 46 and the second direction 48. Thus, it can be seen that the barrel assembly 30 serves to transmit force from the handle assembly 34 to the removable fastener 12 such that a portion of the removable fastener 12 bears against the holding member 50 of the fastener assembly 32 thereby moving the plunger 26 of the removable fastener 12 relative to the fixed support 24 and changing the diameter of the elongated shaft 22 to permit insertion or removal of the elongated shaft 22 into the pre-drilled hole 14.

As best shown in FIG. 2, the elongated barrel 38 is provided with a side wall 56 defining a passage way 58 extending from the first end 42 to the second end 44 thereof. The passage way 58 is sized and adapted to permit passage of the plunger member 40 through the elongated barrel 38 such that the plunger member 40 is slidably movable through the passage way 58 of the elongated barrel 38 in the first direction 46 and the second direction 48. Although in the preferred embodiment, the barrel assembly 30 is formed with the plunger member 40 extending through the passage way 58 defined by the sidewall 56 of the elongated barrel 38, it should be understood that the plunger member 40 does not necessarily have to extend through the passage way 58 of the elongated barrel 38. Moreover, although the plunger member 40 has been described herein for transmitting force from the handle assembly 34, it should be understood that other manners of transmitting the force from the handle assembly 34 could be utilized. For example, any suitable linkage, such as gears, wheels, belts, hydraulics, or other suitable manner of transmitting force from the handle assembly 34 to the removable fastener 12 is contemplated.

The barrel assembly 30 also includes a fork 62 for attaching the barrel assembly 30 to the handle assembly 34. The fork 62 has a first member 64 and a second member 66 (the second member 66 is shown in phantom in FIG. 2). The first member 64 is spaced a distance from the second member 66 so as to form a gap therebetween. In one preferred embodiment, the first member 64 and the second member 66 are connected to the side wall 56 of the barrel assembly 30 such that the side wall 56 supports the first member 64 and the second member 66.

The elongated barrel 38 is pivotally attached to the handle assembly 34 so as to prevent binding between the plunger member 40 and the side wall 56 of the elongated barrel 38. In one preferred embodiment, the handle assembly 34 is provided with a tab 72 to which the first member 64 and the second member 66 are pivotally attached. The first member 64 and the second member 66 can be pivotally attached to the tab 72 in any suitable manner, such as by rivets, bearings, or any other type of pivotal connection known in the art.

At least a portion of the handle assembly 34 is preferably positioned in the gap defined by the first member 64 and the second member 66. The handle assembly 34 has a first gripping member 80, a second gripping member 82, and an elastic member 84 (shown in phantom in FIG. 2). The first gripping member 80 has a first end 86 and a second end 88. The second gripping member 82 also has a first end 90 and a second end 92. The first gripping member 80 is pivotally connected to the second gripping member 82 near the first ends 86 and 90 thereof via any suitable fastener, such as a pin 93. The first end 86 of the second gripping member 82 is pivotally connected to the plunger member 40 via any suitable fastener, such as a pin 94 such that the hand 18 engages the second gripping member 82 on a side (of the pivotal connection between the first gripping member 80 and the second gripping member 82) opposite the pivotal connection of the second gripping member 82 to the plunger member 40.

In general, the first gripping member 80 is maintained in a stationary position relative to the second gripping member 82. The second gripping member 82 is movable in a first direction 95 generally toward the first gripping member 80, and in a second direction 96 generally away from the first gripping member 80. The elastic member 84 biases the second gripping member 82 relative to the first gripping member 80 so as to move the second gripping member 82 in the second direction 96 generally away from the first gripping member 80 thereby retracting the plunger member 40 in the second direction 48. A stop member 97 can optionally be provided on either the first gripping member 80 or the second gripping member 82 to prevent pinching of the user's fingers.

One preferred embodiment of the fastener assembly 32 will now be described in more detail. As discussed above, the fastener assembly 32 is provided with the holding member 50. The holding member 50 has a horizontal portion 100, and a vertical portion 102. The horizontal portion 100 has a first end 104 and a second end 106. A first end 104 of the horizontal portion 100 of the holding member 50 is attached near the first end 42 of the elongated barrel 38. In one preferred embodiment, the first end 104 of the horizontal portion 100 forms an opening 108 sized and dimensioned to receive the elongated barrel 38 there through. Thus, the elongated barrel 38 is disposed through the opening 108 defined by the first end 104 of the horizontal portion 100. To maintain the horizontal portion 100 securely and stablely on the elongated barrel 38, the fastener assembly 32 is provided with a retainer 110 adapted to engage the elongated barrel 38 and the horizontal portion 100. For example, the retainer 1 10 can be a screw threaded through an opening formed in the horizontal portion 100. A groove (which is shown in phantom in FIG. 2) can be provided in the elongated barrel 38 for receiving a portion of the retainer 110. Although the horizontal portion 100 has been described herein as having an opening 108 and a retainer 110 for securely mounting the horizontal portion 100 on the elongated barrel 38, it should be understood that other manners are contemplated. For example, the horizontal portion 100 can be secured on the elongated barrel 38 via tracks, guides, or any other suitable assembly.

As discussed above, the holding member 50 is movable along a longitudinal axis 111 of the elongated barrel 38 so as to permit adjustment of the holding member 50 relative to the anvil 45 positioned on the plunger member 40 so that the tool 10 can be utilized for installing or removing removable fasteners 12 of various sizes and lengths.

In the preferred embodiment shown, the horizontal portion 100 extends parallel to the longitudinal axis 111 of the elongated barrel 38 such that the horizontal portion 100 extends past the anvil 45 connected to the plunger member 40. The vertical portion 102 is connected to the second end 106 of the horizontal portion 100. The vertical portion 102 extends generally normal to the horizontal portion 100 although other angles can be used. The vertical portion 102 has a first end 112 and a second end 114. The first end 112 of the vertical portion 102 is connected to the second end 106 of the horizontal portion 100. A second end 114 of the vertical portion 102 is configured to hold and guide the removable fastener 12 as the removable fastener 12 is installed into or removed from the work piece 16. In one preferred embodiment, the second end 114 is provided with a "U" shaped slot. However, it should be understood that the second end 114 can be shaped in any manner suitable for stabilizing at least a portion of the removable fastener 12. The second end 114 is aligned with the anvil 45 as shown in FIGS. 1 and 2. The second end 114 and the anvil 45 are offset a distance laterally 116 from the elongated barrel 38 and the plunger member 40 of the barrel assembly 30 so that the removable fastener 12 can be installed within tight or inaccessible areas, such as a channel.

To install one of the removable fasteners 12, the removable fastener 12 is positioned adjacent to the second end 114 of the vertical portion 102 so as to stabilize the fixed support 24 of the removable fastener 12. The user then grips the first and second gripping members 80 and 82 and force is applied such that the anvil 45 engages the plunger 26 of the removable fastener 12. Additional force is then applied to the first and second gripping members 80 and 82 to cause the plunger 26 to be moved relative to the fixed support 24 thereby decreasing the diameter of the elongated shaft 22. With the elongated shaft 22 in the decreased position, the elongated shaft 22 is inserted into the pre-drilled hole 14. While the elongated shaft 22 is inserted into the pre-drilled hole 14, force is released from the first and second gripping members 80 and 82 thereby permitting the plunger 26 to move relative to the fixed support 24 and increase the diameter of the elongated shaft 22 to maintain the removable fastener 12 in the pre-drilled hole 14.

Once the removable fastener 12 has been installed in the work piece 16, the removable fastener 12 can be removed by reversing the sequence of steps discussed above.

Figure 3:
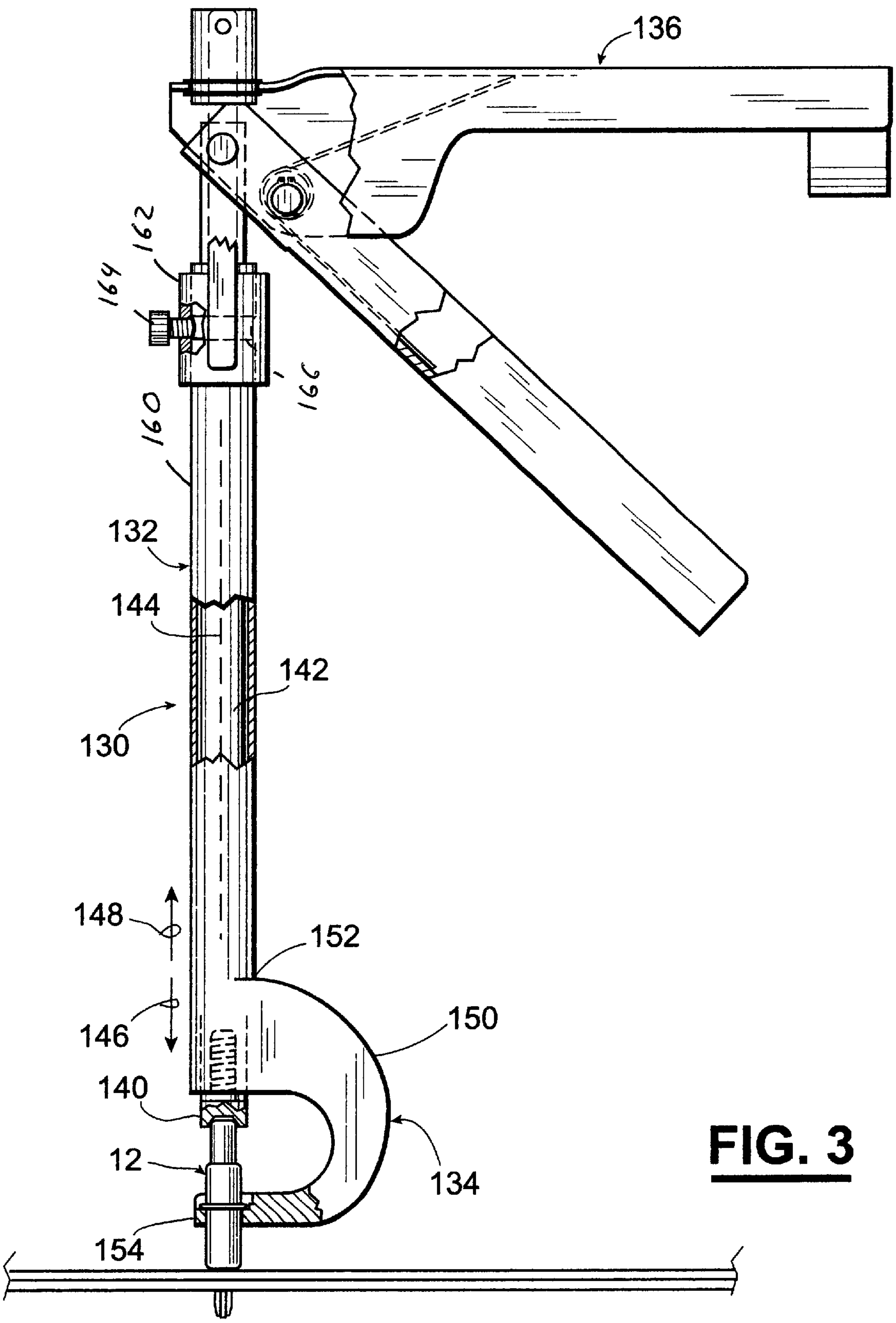
FIG. 3 is a partial, cross-sectional side view of another embodiment of a tool for installing removable fasteners.

Referring now to FIG. 3, shown therein and designated by a reference numeral 130, is a second embodiment of a tool, constructed in accordance with the present invention, for installing and removing the removable fastener 12. The tool 130 is provided with a barrel assembly 132, a fastener assembly 134 and a handle assembly 136. The tool 130 is similar in construction and function as the tool 10 hereinbefore described in detail with reference to FIGS. 1 and 2, except as discussed hereinafter.

The barrel assembly 132 is provided with an anvil 140 and a plunger member 142. The plunger member 142 has a longitudinal axis 144. The anvil 140 is adjustably connected to the plunger member 142 via threads, tracks, guides or the like to permit adjustment of the anvil 140 relative to the plunger member 142 in a first direction 146 generally away from the plunger member 142, and a second direction 148 generally toward the plunger member 142.

The fastener assembly 134 is provided with a holding member 150. The holding member 150 is provided with a first end 152 connected to a portion of the barrel assembly 132, and a second end 154. The second end 154 is shaped to stabilize the removable fastener 12. The second end 154 is spaced a distance from the anvil 140. The anvil 140 is aligned with the longitudinal axis 144 of the plunger member 142. The holding member 150 is provided with a substantially arcuate shape.

As an optional feature, the barrel assembly 132 includes an elongated barrel 160 rotatably positioned within a collar 162. A retaining member 164, such as a screw or a knurled finger nut, is positioned through the collar 162 and selectively engages the elongated barrel to permit or prevent rotation of the elongated barrel 160. The elongated barrel 160 can be provided with an annular groove 166 in which a portion of the retaining member 164 is disposed. The rotation of the elongated barrel 160 permits the angular location of the holding member 150 to be varied to aid the insertion or removal of removable fasteners 12 in tight locations.

The tool 130 is used in a similar manner as the tool 10, which was discussed previously with reference to FIGS. 1 and 2. Thus, no further comments are deemed necessary to teach one skilled in the art to use the tool 130.

Changes may be made in the embodiments of the invention described herein, or in the parts or the elements of the embodiments described herein or in the steps or sequence of steps of the methods described herein without departing from the spirit and/or the scope of the invention as defined in the following claims.

What is claimed is:

1. A hand powered tool for installing a removable fastener of the type having an elongated shaft, a fixed support and a plunger, the plunger being biased relative to the fixed support for installation and removal of the removable fastener in a pre-drilled hole of a workpiece by applying force to the plunger relative to the fixed support, the elongated shaft being operably connected to the plunger whereby movement of the plunger relative to the fixed support varies the diameter of the elongated shaft such that the diameter of the removable fastener can be decreased to permit insertion of the elongated shaft into the hole of the workpiece, and increased to prevent removal of the elongated shaft from the hole formed in the workpiece, the tool comprising:

a barrel assembly having an elongated barrel, a plunger member, and an anvil connected to the plunger member for engaging the removable fastener, the elongated barrel having a first end and a second end, the plunger member having a first end and a second end, the plunger member being supported by the elongated barrel and at least a portion of the plunger member positioned adjacent to the second end of the elongated barrel, the plunger member being movable in a first direction and a second direction;

a fastener assembly having a holding member, the holding member being spaced a distance from the second end of the elongated barrel for creating a gap to receive the fixed support and the plunger of the removable fastener and whereby upon insertion of the fixed support and the plunger into the gap the holding member stabilizes the fixed support and the anvil is engagable with the plunger; and a handle assembly adapted to be powered by the hand of an individual, the handle assembly being operably connected to the plunger member for selectively moving the plunger relative to the fastener assembly in the first direction and the second direction.

2. The tool of claim 1, wherein the elongated barrel has a sidewall defining a passageway extending from the first end to the second end thereof, the passageway sized and adapted to permit passage of the plunger member through the elongated barrel, the plunger member being slidably movable through the passageway of the elongated barrel in the first direction and the second direction.

3. The tool of claim 1, wherein the handle assembly has a first gripping member, a second gripping member and an elastic member, said elastic member biasing the first gripping member and the second gripping member with respect to each other.

4. The tool of claim 3, wherein the first gripping member is fixed and the second gripping member is movable against the force of the elastic member such that when the second gripping member is moved toward the first gripping member the elastic member urges the second gripping member away from the first gripping member.

5. The tool of claim 1, wherein the holding member of the fastener assembly is provided with a slot for permitting the elongated shaft of the removable fastener to extend past the holding member.

6. The tool of claim 1, the fastener assembly having an adjustable member operably connected to the elongated barrel so as to adjust the fastener assembly for removable fasteners of various predetermined sizes.

7. The tool of claim 1, wherein the anvil extends a distance angularly from the plunger member such that a portion of the anvil is offset a distance laterally from the plunger member.

8. The tool of claim 1, wherein the anvil is aligned with a longitudinal axis of the plunger member.

9. A hand powered tool for installing a removable fastener of the type having an elongated shaft, a fixed support and a plunger, the plunger being biased relative to the fixed support for installation and removal of the removable fastener in a pre-drilled hole of a workpiece by applying force to the plunger relative to the fixed support, the elongated shaft being operably connected to the plunger whereby movement of the plunger relative to the fixed support varies the diameter of the elongated shaft such that the diameter of the removable fastener can be decreased to permit insertion of the elongated shaft into the hole of the workpiece, and increased to prevent removal of the elongated shaft from the hole formed in the workpiece, the tool comprising:

a barrel assembly having an elongated barrel, and an anvil supported by the elongated barrel such that the anvil is movable in a first direction and a second direction;

means for stabilizing the fixed support of the removable fastener such that the plunger of the removable fastener is positioned adjacent to the anvil; and means, powered by a hand of an individual, for selectively moving the anvil in the first direction and the second direction.

10. The tool of claim 9, wherein the elongated barrel has a sidewall defining a passageway extending from a first end to a second end thereof, the passageway sized and adapted to permit passage of a plunger member through the elongated barrel, the plunger member being slidably movable through the passageway of the elongated barrel in the first direction and the second direction.

11. The tool of claim 10, wherein the means for selectively moving the anvil has a first gripping member, a second gripping member and an elastic member, said elastic member biasing the first gripping member and the second gripping member with respect to each other.

12. The tool of claim 11, wherein the first gripping member is fixed and the second gripping member is movable against the force of the elastic member such that when the second gripping member is moved toward the first gripping member the elastic member urges the second gripping member away from the first gripping member.

13. The tool of claim 10, wherein the means for stabilizing the fixed support of the removable fastener comprises a holding member having a slot for permitting the elongated shaft of the removable fastener to extend past the holding member.

14. The tool of claim 10, wherein the means for stabilizing the fixed support of the removable fastener further comprises means for adjusting the tool to permit various sizes of removable fasteners to be stabilized.

15. The tool of claim 10, wherein the anvil extends a distance angularly from the elongated barrel such that a portion of the anvil is offset a distance laterally from the elongated barrel.

16. The tool of claim 10, wherein the anvil is aligned with a longitudinal axis of the elongated barrel.

* * * * *